(12) United States Patent
Konaka (10) Patent No.: US 6,722,198 B1
(45) Date of Patent: Apr. 20, 2004

(54) EXTERNAL-FORCE DETECTING SENSOR

(75) Inventor: Yoshihiro Konaka, Sagamihara (JP)

(73) Assignee: Murata Manufacturing Co., Ltd., Kyoto (JP)

(*) Notice: Subject to any disclaimer, the term of this patent is extended or adjusted under 35 U.S.C. 154(b) by 145 days.

(21) Appl. No.: 09/694,700

(22) Filed: Oct. 23, 2000

(30) Foreign Application Priority Data

Oct. 25, 1999 (JP) ............................................. 11-302177

(51) Int. Cl.$^7$ ................................................ G01P 3/04
(52) U.S. Cl. ..................................... 73/511; 73/504.03
(58) Field of Search ............................. 73/511, 504.02, 73/514.02, 514.01, 504.03, 514.16, 504.12, 504.14

(56) References Cited

U.S. PATENT DOCUMENTS

| | | | |
|---|---|---|---|
| 4,930,351 A | | 6/1990 | Macy et al. |
| 5,438,870 A | * | 8/1995 | Zabler et al. ............. 73/504.02 |
| 5,691,471 A | * | 11/1997 | Okazaki et al. .......... 73/504.04 |
| 5,723,790 A | * | 3/1998 | Andersson ............... 73/514.36 |
| 5,751,154 A | * | 5/1998 | Tsugai ........................ 324/661 |
| 5,859,368 A | * | 1/1999 | Cargille .................... 73/504.15 |
| 5,864,063 A | * | 1/1999 | Otani et al. ............... 73/514.32 |
| 6,018,996 A | * | 2/2000 | Matsuhiro et al. ....... 73/504.12 |
| 6,018,998 A | * | 2/2000 | Zunino et al. ............ 73/514.16 |
| 6,122,965 A | * | 9/2000 | Seidel et al. ............. 73/514.36 |
| 6,161,440 A | * | 12/2000 | Hulsing, II et al. ...... 73/862.59 |
| 6,257,058 B1 | * | 7/2001 | Murata ..................... 73/504.16 |
| 6,450,030 B1 | * | 9/2002 | Fujimoto .................. 73/504.04 |
| 6,473,290 B2 | * | 10/2002 | Mochida ..................... 361/291 |

FOREIGN PATENT DOCUMENTS

| | | |
|---|---|---|
| DE | 44 36 396 A1 | 4/1996 |
| JP | 7-83666 | 3/1995 |
| JP | 7-120490 | 5/1995 |
| JP | 7-128356 | 5/1995 |
| JP | 8-68636 | 3/1996 |
| JP | 10-318755 | 12/1998 |

* cited by examiner

Primary Examiner—Hezron Williams
Assistant Examiner—Jacques Saint-Surin
(74) Attorney, Agent, or Firm—Keating & Bennett, LLP (57) ABSTRACT

An external-force detecting sensor includes a sensor unit for commonly detecting angular velocity and acceleration; an angular-velocity/acceleration mix signal outputting unit for outputting an angular-velocity/acceleration mix signal comprised of an angular-velocity component in accordance with the magnitude of angular velocity and an acceleration component in accordance with the magnitude of acceleration that are detected by the sensor unit; and a signal separating unit for separating and extracting the angular-velocity component and the acceleration component from the angular velocity/acceleration mix signal to output as an angular-velocity signal and an acceleration signal.

9 Claims, 6 Drawing Sheets

EXTERNAL-FORCE DETECTING SENSOR

BACKGROUND OF THE INVENTION

1. Field of the Invention

The present invention relates to external-force detecting sensors capable of detecting angular velocity and acceleration.

2. Description of the Related Art

Figure 3:
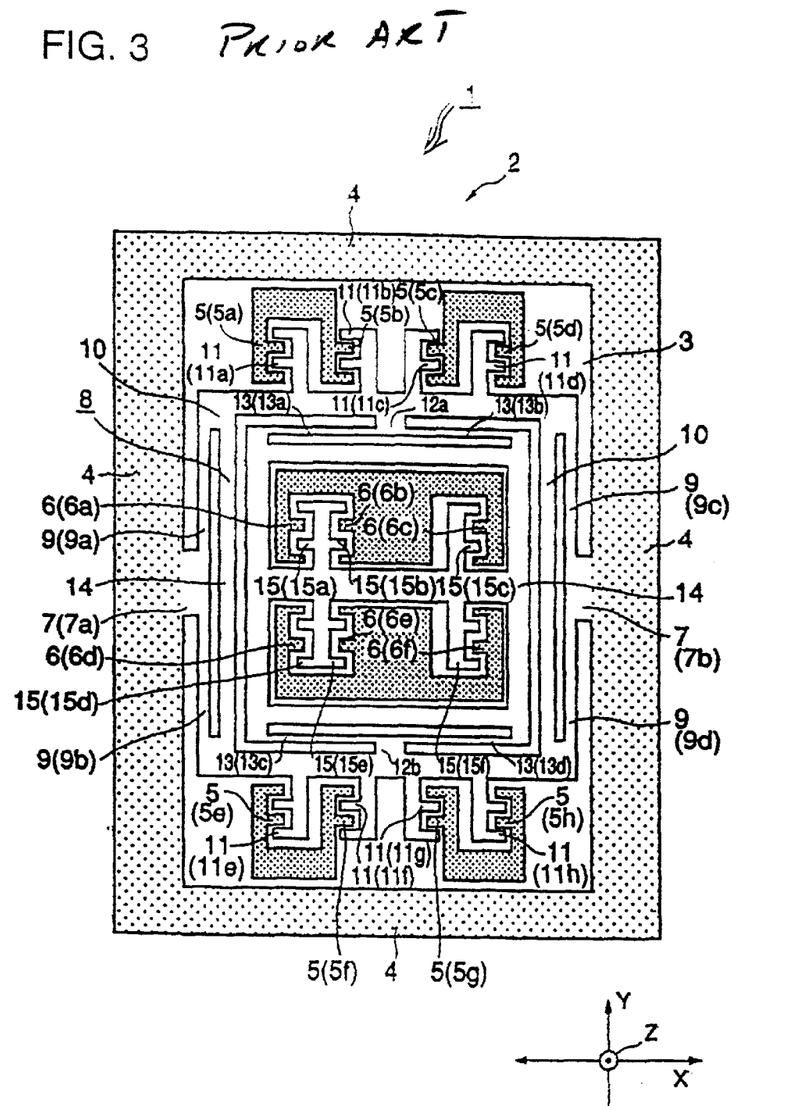
FIG. 3 is an illustration showing a conventional sensor unit which may be used in several embodiments of the present invention.

FIG. 3 shows the top view of a structural example of a conventional sensor unit 2 constituting a gyroscope 1. The sensor unit 2 has a substrate 3. On the upper surface of the substrate 3, a supporting/fixing portion 4, comb-teeth-formed driving fixed-electrode portions 5 (5a, 5b, 5c, 5d, 5e, 5f, 5g, and 5h), and detecting fixed-electrode portions 6 (6a, 6b, 6c, 6d, 6e, and 6f) are disposed in a fixing manner. The supporting/fixing portion 4 is connected to an oscillating element 8 via supporting portions 7 (7a and 7b).

The oscillating element 8 is spaced from the top surface of the substrate 3 and can oscillate in two directions including an X direction and a Y direction shown in FIG. 3. The oscillating element 8 is constituted of drive beams 9 (9a, 9b, 9c, and 9d), an outer frame 10, comb-teeth-formed driving movable-electrode portions 11 (11a, 11b, 11c, 11d, 11e, 11f, 11g, and 11h), supporting portions 12 (12a and 12b), detecting beams 13 (13a, 13b, 13c, and 13d), an inner frame 14, and comb-teeth-formed detecting movable-electrode portions 15 (15a, 15b, 15c, 15d, 15e, and 15f).

That is, one end of the drive beam 9a and one end of the drive beam 9b are commonly connected to the supporting portion 7a. One end of the drive beam 9c and one end of the drive beam 9d are commonly connected to the supporting portion 7b.

The remaining ends of the drive beams 9a, 9b, 9c, and 9d are commonly connected to the outer frame 10.

Regarding the outer frame 10, comb-teeth-formed driving movable-electrode portions 11 are disposed in such a manner that they mesh with the corresponding comb-teeth-formed driving fixed-electrode portions 5 via distances therebetween. The pairs of the comb-teeth-formed driving fixed-electrode portions 5a, 5b, 5c, and 5d and the comb-teeth-formed driving movable electrode portions 11a, 11b, 11c, and 11d, which are mutually opposing, form a first driving section, and the pairs of the comb-teeth-formed driving fixed-electrode portions 5e, 5f, 5g, and 5h and the comb-teeth-formed driving movable-electrode portions 11e, 11f, 11g, and 11h form a second driving section.

In addition, regarding the outer frame 10, the supporting portions 12a and 12b are formed in an extended manner toward the inner side of the outer frame 10. The detecting beams 13a and 13b are extended from the top-end side of the supporting portion 12a, and the detecting beams 13c and 13d are extended from the supporting portion 12b.

The inner frame 14 is commonly connected to the extended top-end sides of the detecting beams 13a, 13b, 13c, and 13d. Regarding the inner frame 14, the comb-teeth-formed detecting movable-electrode portions 15 are disposed in such a manner that they mesh with the corresponding comb-teeth-formed detecting fixed-electrode portions 6 via distances therebetween. The pairs of the comb-teeth-formed detecting fixed-electrode portions 6a, 6b, and 6c and the comb-teeth-formed detecting movable-electrode portions 15a, 15b, and 15c, which are mutually opposing, form a first detecting section, and the pairs of the comb-teeth-formed detecting fixed-electrode portions 6d, 6e, and 6f and the comb-teeth-formed detecting movable-electrode portions 15d, 15e, and 15f, which are mutually opposing, form a second detecting section.

A conductive pattern for supplying electrical power from the outside to the driving fixed-electrode portions 5 and a conductive pattern electrically connected to the detecting fixed-electrode portions 6 are formed. However, this is not shown in the figure.

In the sensor unit 2, when an AC driving voltage (a driving signal) is applied between the driving fixed-electrode portions 5 and the driving movable-electrode portions 11, which are mutually opposing, according to changes in the magnitude of electrostatic power based on the driving voltage, the entire oscillating element 8 oscillates in the X direction shown in FIG. 3 by using the flexibility of the drive beams 9, with the supporting portions 7a and 7b serving as fulcrums.

In the state in which the oscillating element 8 oscillates in the X direction, when the oscillating element 8 rotates around a Z direction as a center axis (which is a direction perpendicular to the paper surface in FIG. 3), a Coriolis force occurs in a direction orthogonal both to the driving direction (X direction) of the oscillating element 8 and the central-axis direction (Z direction) of rotation, that is, in a Y direction. By the Coriolis force occurring in the Y direction, the inner frame 14 of the oscillating element 8 performs detection/oscillation in the Y direction relatively with respect to the outer frame 10 by using the flexibility of the detecting beams 13 with the supporting portions 12a and 12b as fulcrums.

The magnitude of angular velocity around the Z axis can be detected by detecting changes in capacitance between the detecting fixed-electrode portions 6 and the detecting movable-electrode portions 15 based on the detection oscillation in the Y direction.

The sensor unit 2, in order to avoid negative influences such as air damping, for example, is contained in a containing space formed of a glass member to be sealed therein in a reduced-pressure state. In this case, the driving fixed-electrode portions 5 and the detecting fixed-electrode portions 6 of the sensor unit 2 can be electrically connected to the outside via through-holes disposed in the glass member.

Figure 6:
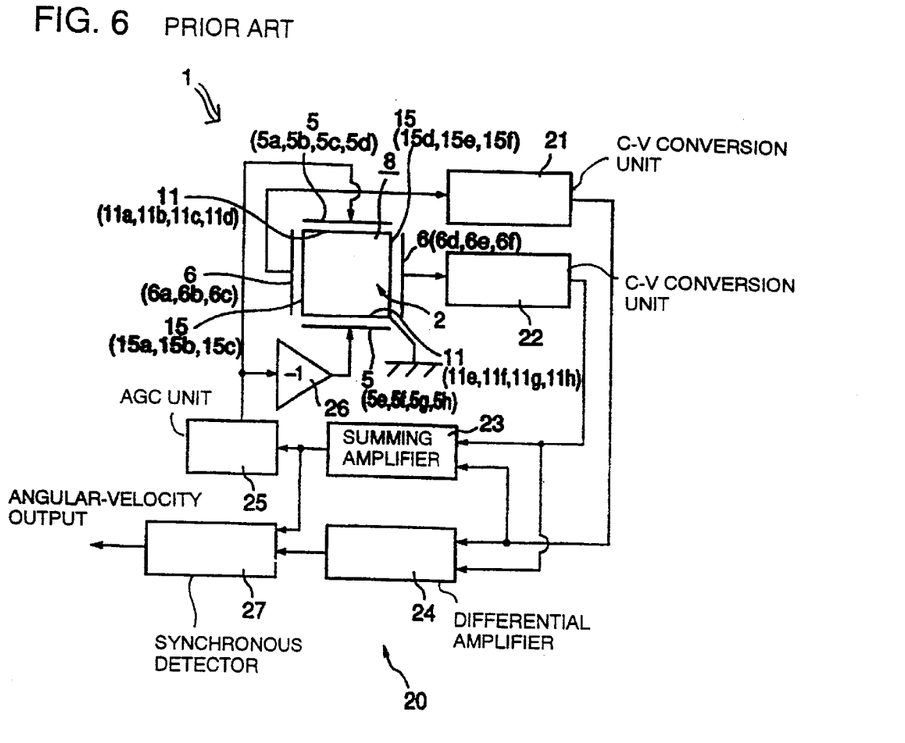
FIG. 6 is a block diagram showing the structural example of a signal processing circuit forming a conventional gyroscope.

In FIG. 6, an example of a signal processing circuit connected to the sensor unit 2 is shown with the main part of the sensor unit 2. A signal processing circuit 20 is constituted of. a first detecting C-V conversion unit 21, a second detecting C-V conversion unit 22, a summing amplifier 23, a differential amplifier 24, an AGC (Auto Gain Control) unit 25, a phase inverter 26, and a synchronous detector 27. In the illustration shown in FIG. 6, in order to describe the structure of the signal processing circuit so as to facilitate understanding, the driving fixed-electrode portions 5, the detecting fixed-electrode portions 6, and the oscillating element 8 included in the sensor unit 2 are shown in a simplified manner.

The first detecting C-V conversion unit 21 converts the overall capacitance between the detecting fixed-electrode portions 6 (6a, 6b, and 6c) and the detecting movable-electrode portions 15 (15a, 15b, and 15c) forming the first detecting section of the sensor unit 2 into a voltage to output as a signal. In addition, the second detecting C-V conversion unit 22 converts the overall capacitance between the detecting fixed-electrode portions 6 (6d, 6e, and 6f) and the detecting movable-electrode portions 15 (15d, 15e, and 15f) forming the second detecting section into a voltage to output as a signal.

Figure 4A:
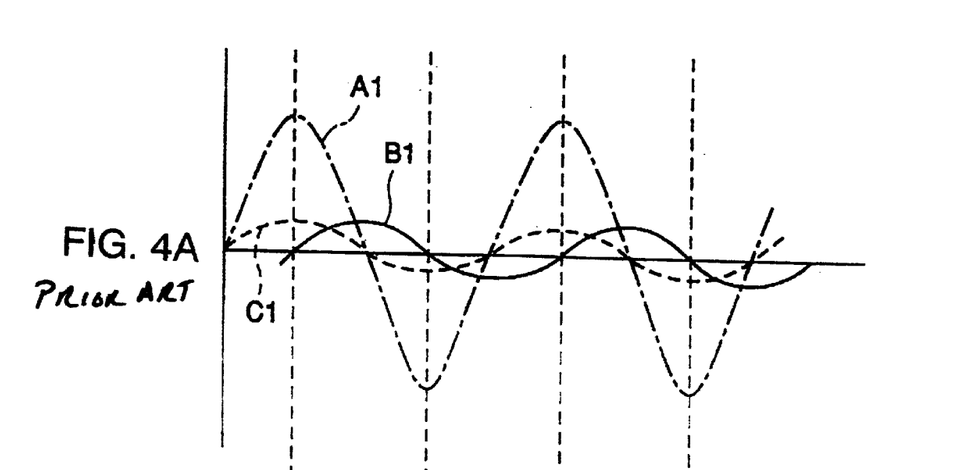
FIG. 4 is a waveform showing the waveform example of a signal output from a C-V conversion unit shown in each of FIG. 1 and FIG. 2.

When the oscillating element 8 oscillates only in the X direction, the signal output from the first detecting C-V conversion unit 21, for example, is a signal A1 having a waveform as indicated by a dot-dash line A1 shown in FIG. 4A. The signal A1 produced due to the oscillation of the oscillating element 8 is 90° out of phase with the driving signal applied between the driving fixed-electrode portions 5 and the driving movable-electrode portions 11 to allow the oscillating element 8 to oscillate.

In addition, when the inner frame 14 of the oscillating element 8 oscillates not only in the X direction but also in the Y direction due to angular velocity, the output signal of the first detecting C-V conversion unit 21 is a signal formed by superimposition of the above signal component A1 produced by the oscillation of the oscillating element 8 and a signal component B1 produced by angular velocity having a waveform indicated by a solid line B1 shown in FIG. 4A. The signal component B1 has the magnitude of amplitude in accordance with the magnitude of the angular velocity, and the phase of the signal component B1 deviates by 90° from the phase of the signal component A1.

In addition, there is a case in which the inner frame 14 oscillates not only due to the angular velocity but also due to acceleration in the Y direction. In this situation, the output signal of the first detecting C-V conversion unit 21 is a signal formed by superimposition of the signal component A1 based on the oscillation of the oscillating element 8, the signal component B1 produced due to the angular velocity, and a signal component C1 produced due to acceleration having a waveform indicated by a dotted line C1 shown in FIG. 4A. The signal component C1 has the magnitude of amplitude in accordance with the magnitude of the acceleration, and the signal component C1 is in phase with the signal component A1.

Figure 4B:
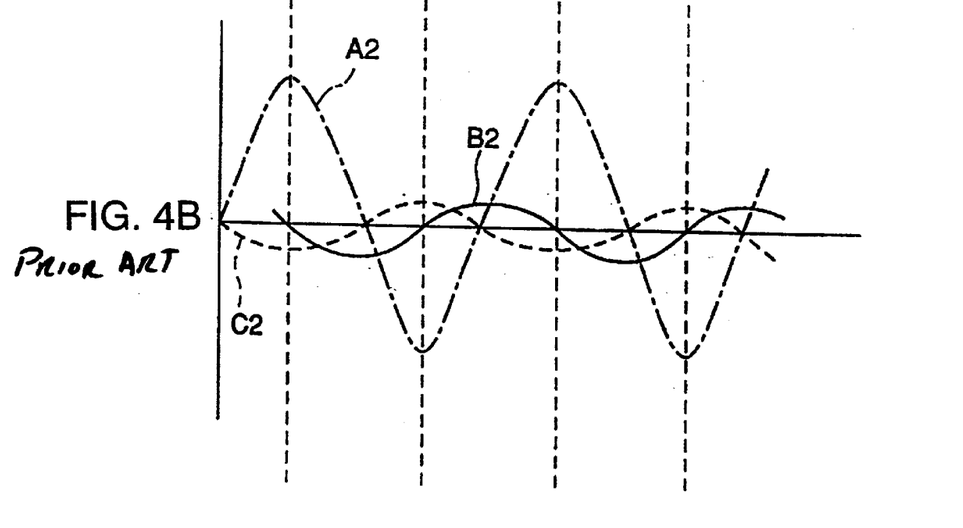

Similarly, when the oscillating element 8 only oscillates in the X-direction, the signal output from the second detecting C-V conversion unit 22 is a signal A2 having a waveform indicated by a dot-dash line A2 shown in FIG. 4B. The signal A2 is a signal whose amplitude and phase are equal to those of the signal A1 output from the first detecting C-V conversion unit 21.

Moreover, when the inner frame 14 of the oscillating element 8 oscillates due to oscillation of the oscillating element 8 and angular velocity, the signal output from the second detecting C-V conversion unit 22 is a signal formed by superimposition of the signal component A2 produced due to the oscillation of the oscillating element 8 and a signal component B2 produced due to angular velocity having a waveform indicated by a solid line B2 shown in FIG. 4B. The signal component B2 has the magnitude of amplitude in accordance with the magnitude of the angular velocity. That is, the signal component B2 has the magnitude of amplitude, which is approximately equal to the magnitude of the amplitude of the signal component B1 in the signal output from the first detecting C-V conversion unit 21. The signal component B2 is 90° out of phase with the signal component A2. In addition, the signal component B2 is 180° out of phase with the signal component B1 of the output signal of the first detecting C-V conversion unit 21.

Moreover, when the inner frame 14 of the oscillating element 8 oscillates due to oscillation of the oscillating element 8, angular velocity, and acceleration, the signal output from the second detecting C-V conversion unit 22 is a signal formed by superimposition of the signal component A2 based on the drive-oscillation, the signal component B2 produced due to the angular velocity, and a signal component C2 produced due to an acceleration having a waveform indicated by a dotted line C2 shown in FIG. 4B. The signal component C2 has the magnitude of amplitude in accordance with the magnitude of the acceleration. That is, the signal component C2 has the magnitude of amplitude, which is approximately equal to the magnitude of the amplitude of the signal component C1 in the signal output from the first detecting C-V conversion unit 21. The signal component C2 is 180° out of phase with the signal component A2 and the signal component C1.

As described above, the first detecting C-V conversion unit 21 and the second detecting C-V conversion unit 22 output signals in accordance with the status of oscillation of the oscillating element 8 to the summing amplifier 23 and the differential amplifier 24.

The summing amplifier 23 sums and amplifies the signal output from the first detecting C-V conversion unit 21 and the signal output from the second detecting C-V conversion unit 22. By summing of the signals performed by the summing amplifier 23, the signal component B1 in the signal output from the first detecting C-V conversion unit 21 produced due to the angular velocity and the signal component B2 in the signal output from the second detecting C-V conversion unit 22 are canceled and eliminated. Similarly, the signal component C1 and the signal component C2 produced due to the acceleration are canceled and eliminated. With this operation, the summing amplifier 23 outputs a signal only in accordance with the signal component produced by the oscillation of the oscillating element 8, in which the signal component A1 and the signal component A2 are summed, as a drive detecting signal (a monitoring signal), to the AGC unit 25 and the synchronous detector 27. In other words, the summing amplifier 23 serves as a drive-oscillation detecting unit for outputting a drive detecting signal in accordance with the oscillation of the oscillating element 8 in the driving direction (the X direction).

The AGC unit 25 outputs a driving signal in such a manner that the output of the driving signal obtained when the oscillating element 8 oscillates at a resonant frequency is constantly fixed. The driving signal is applied exactly as it is to the driving section (the first driving section in the example shown in FIG. 6) in one of the pairs of the comb-teeth-formed driving fixed-electrode portions 5 (5a, 5b, 5c, and 5d) and the comb-teeth-formed driving movable-electrode portions 11 (11a, 11b, 11c, and 11d) forming the first driving section and the pairs of the comb-teeth-formed driving fixed-electrode portions 5 (5e, 5f, 5g, and 5h) and the comb-teeth-formed driving movable-electrode portions 11 (11e, 11f, 11g, and 11h) forming the second driving section, and a driving signal obtained by the phase inversion of the above driving signal performed by the phase inverter 26 is applied to the other driving section. Applying of the driving signal permits the oscillating element 8 to drive-oscillate as described above.

The differential amplifier 24 obtains a difference between the signal output from the first detecting C-V conversion unit 21 and the signal output from the second detecting C-V conversion unit 22. With the differential motion of the signal of the differential amplifier 24, the signal component A1 produced by the drive-oscillation in the output signal of the first detecting C-V conversion unit 21 and the signal component A2 produced by the drive-oscillation in the output signal of the second detecting C-V conversion unit 22 are canceled. With this arrangement, the differential amplifier 24 outputs an angular-velocity/acceleration mix signal based on a signal component B3 indicated by a solid line B3 shown in FIG. 5, which is formed by summing the signal component B1 and the signal component B2 produced due to the angular velocity and a signal component C3 indicated by a dotted line C3 shown in FIG. 5, which is formed by summing of the signal component C1 and the signal component C2 produced due to the acceleration.

In other words, the differential amplifier 24 serves as an angular-velocity/acceleration mix signal outputting unit for outputting the angular-velocity/acceleration mix signal in which an angular-velocity component B3 in accordance with the magnitude of the angular velocity and an acceleration component C3 in accordance with the magnitude of the acceleration are mixed.

The synchronous detector 27 contains a phase shifter (not shown). With the phase shifter, the phase of the drive detecting signal output from the summing amplifier 23 is deviated by 90° to generate an angular-velocity referring signal. The synchronous detector 27 uses the angular-velocity referring signal to perform synchronous detection of the angular-velocity/acceleration mix signal output from the differential amplifier 24.

Figure 5:
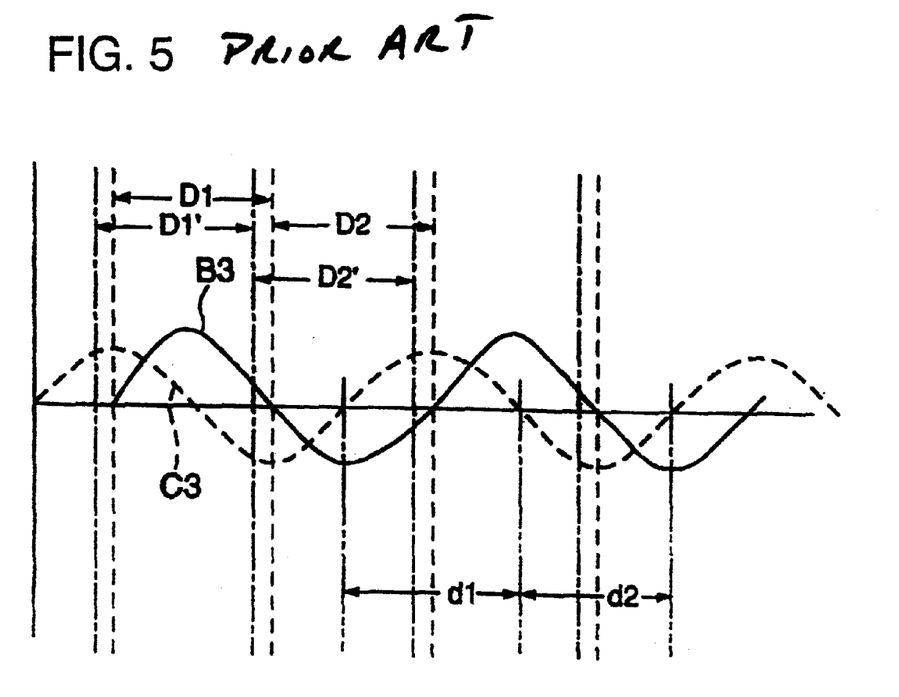
FIG. 5 is a waveform example showing the waveform example of an angular-velocity/acceleration mix signal.

In other words, the angular-velocity referring signal is a signal in phase with the angular-velocity component B3 of the angular-velocity/acceleration mixed signal or. 180° out of phase therewith. The synchronous detector 27 performs the integration of the angular-velocity/acceleration mix signal (performs synchronous detection) in a division D1 in which the phase of the angular-velocity referring signal is between 0° and 180° and a division D2 in which the phase of the angular-velocity referring signal is between 180° and 360°. The synchronous detection permits the acceleration component C3 of the angular-velocity/acceleration mix signal to be eliminated. As a result, the synchronous detector 27 outputs a signal in accordance with the angular-velocity component B3 as an angular-velocity signal. The angular-velocity signal permits the magnitude of the angular velocity to be detected.

The gyroscope 1 having the sensor unit 2 shown in FIG. 3 and the signal processing circuit 20 shown in FIG. 6 can detect only angular velocity. Thus, when a sensor capable of detecting both angular velocity and acceleration is intended to be formed, besides the gyroscope 1, an acceleration sensor having an oscillating element for detecting acceleration is provided. Then, the gyroscope 1 and the acceleration sensor are combined to form a sensor capable of detecting both angular velocity and acceleration.

In such a sensor, since the two oscillating elements including an angular-velocity-detecting oscillating element and the acceleration-detecting oscillating element need to be accommodated, the size of the sensor is increased.

In addition, in the above gyroscope 1, when the synchronous detector 27 performs the synchronous detection of an angular-velocity/acceleration mix signal, there is a possibility that detection-angle deviation occurs in which the phase of an angular-velocity referring signal deviates from the angular-velocity component B3 in the angular-velocity/acceleration mix signal. In this case, the synchronous detection of the angular-velocity/acceleration mix signal is performed in divisions Dl and D2 which deviate from the regular divisions D1 and D2 shown in FIG. 5.

In this case, due to the detection-angle deviation, it is impossible to completely eliminate the acceleration component C3 of the angular-velocity/acceleration mix signal, and the acceleration component C3 still remains. As a result, an acceleration noise component based on the acceleration component C3 rides on an angular-velocity signal output from the synchronous detector 27. Due to the acceleration noise component, the precise magnitude of angular velocity cannot be obtained.

SUMMARY OF THE INVENTION

The present invention is provided to solve the above problems. The first object of the invention is to provide a compact external-force detecting sensor capable of detecting both angular velocity and acceleration. The second object thereof is to provide an external-force detecting sensor capable of facilitating improvement in precision for detecting angular velocity and acceleration.

In order to accomplish the above objects, the present invention provides an arrangement in which there are disposed a sensor unit for commonly detecting angular velocity and acceleration; an angular-velocity/acceleration mix signal outputting unit for outputting an angular velocity/acceleration mix signal comprised of an angular velocity component in accordance with the magnitude of angular velocity and an acceleration component in accordance with the magnitude of acceleration that are detected by the sensor unit; and a signal separating unit for separating and extracting the angularvelocity component and the acceleration component from the angular-velocity/acceleration mix signal to output as an angular-velocity signal and an acceleration signal.

In accordance with one aspect of the invention, the angular velocity component and the acceleration component included in the angular velocity/acceleration mix signal are AC components in which the angular-velocity component is 90° out of phase with the acceleration component; the signal separating unit has an angular-velocity signal extracting unit and an acceleration signal extracting unit, the angular-velocity signal extracting unit uses an angular-velocity referring signal in phase with the angular-velocity component or 180° out of phase therewith to synchronously detect the angular velocity/acceleration mix signal and eliminate the acceleration component so as to output an angular-velocity signal in accordance with an angular-velocity component, and the acceleration signal extracting units uses an acceleration referring signal in phase with the acceleration component or 180° out of phase therewith to syrichronically detect the angular-velocity/acceleration mix signal and eliminate the angular-velocity component so as to output an acceleration signal in accordance with the acceleration component.

In accordance with a second aspect of the present invention, the sensor unit has an oscillating element capable of freely oscillating in a direction in which angular velocity and acceleration are commonly detected, and the angular-velocity/acceleration signal outputting unit outputs an angular-velocity/acceleration mix signal comprised of an angular-velocity component based on the oscillation of the oscillating element in the detecting direction due to angular velocity and an acceleration component based on the oscillation of the oscillating element in the detecting direction due to acceleration.

In accordance with a third aspect of the present invention, the sensor unit has an oscillating element capable of freely oscillating both in a direction in which angular velocity and acceleration are commonly detected and in a driving direction orthogonal to the detecting direction, and has a drive-oscillation detecting unit for outputting a driving detecting signal in accordance with the oscillation of the oscillating element in the driving direction; the angular-velocity/acceleration signal outputting unit outputs an angular-velocity/acceleration mix signal comprised of an angularvelocity component based on the oscillation of the oscillating element in the detecting direction due to angular velocity and an acceleration component based on the oscillation of the oscillating element in the detecting direction due to acceleration; the angular-velocity referring signal is a signal of 90° out of phase with the drive-detecting signal and the acceleration referring signal is a signal in phase with the drive-detecting signal or 180° out of phase therewith.

In accordance with a fourth aspect of the present invention, each of the angular-velocity signal extracting units and the acceleration signal extracting units may have an attenuating unit for detecting and attenuating the remaining signal as a noise component, and a noise eliminating unit for taking out a signal obtained by the attenuating operation of the attenuating unit from the respective extracted signal to eliminate the noise component included in the extracted signal.

In the invention of the above arrangements, the signal separating unit obtains the angular-velocity/acceleration mix signal output from the angular-velocity/acceleration mix signal outputting unit, and separates an angular-velocity component and an acceleration component from the angular-velocity/acceleration mix signal to extract as an angular-velocity signal and an acceleration signal.

By having the signal separating unit, with only one sensor unit for commonly detecting angular velocity and acceleration disposed, an angular-velocity signal according to the magnitude of angular velocity and an acceleration signal according to the magnitude of acceleration can be separately obtained. As a result, by disposing the single sensor unit, it is possible to detect both angular velocity and acceleration. With this arrangement, since it is unnecessary to dispose independent two sensor units such as an angular-velocity detecting sensor unit and an acceleration detecting sensor unit, the external-force detecting sensor capable of detecting both angular velocity and acceleration can be greatly miniaturized.

As described above, since the angular-velocity component and the acceleration component can be separately taken out from the angular-velocity/acceleration mix signal, for example, due to the detection-angle deviation, even though an acceleration noise component produced by the acceleration component rides on an angular-velocity signal, the acceleration noise component can be eliminated from the angular-velocity signal by using the detected acceleration signal. Similarly, a noise component with an angular-velocity component produced due to the detection-angle deviation can be eliminated from the acceleration signal. With this arrangement, the magnitudes of the angular velocity and the acceleration can be detected with high precision, with the result that the detecting precision of the external-force detecting sensor can be improved.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Hereinafter, the preferred embodiments of the present invention are explained in detail with reference to the drawings.

Figure 1:
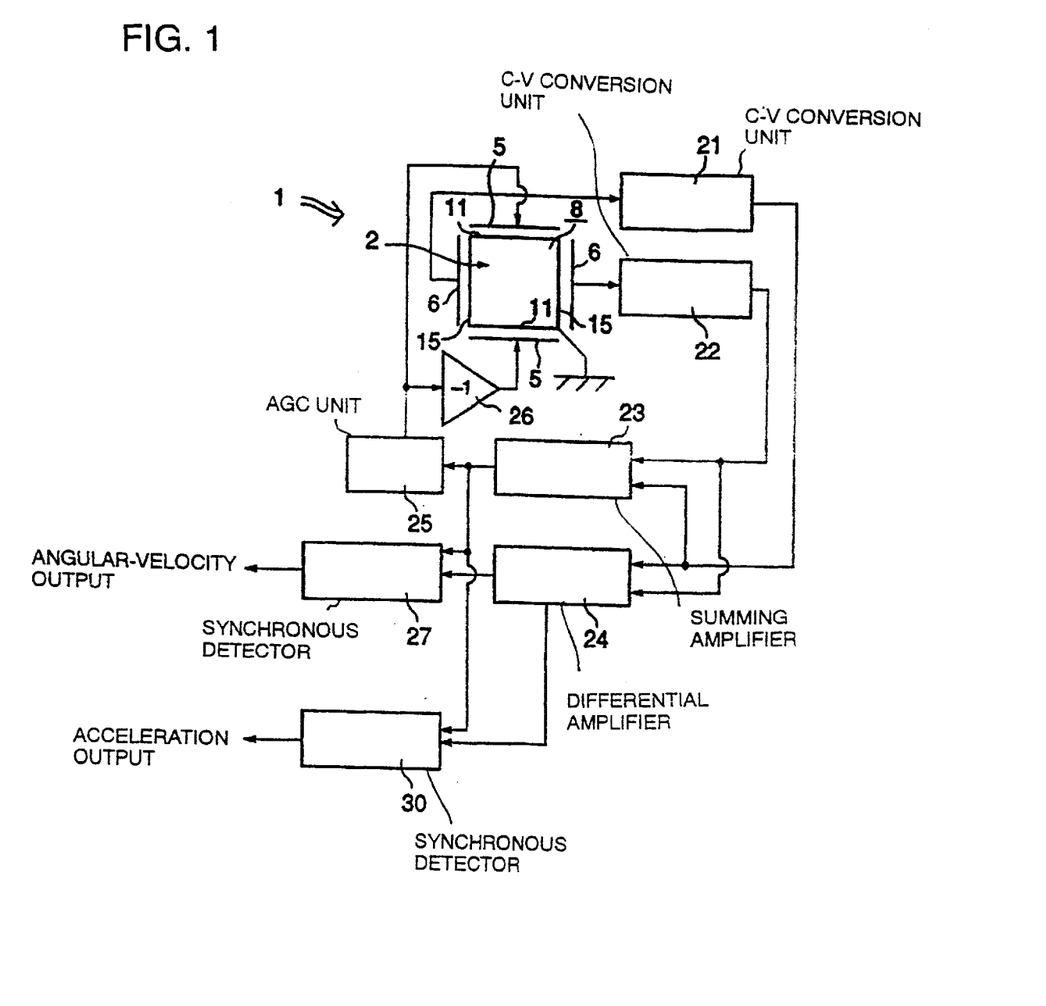
FIG. 1 is a block diagram showing the structure of a signal processing circuit characteristic in a first embodiment of the present invention.

In an external-force detecting sensor according to a first embodiment of the present invention, a sensor unit as shown in FIG. 3 is connected to a signal processing circuit shown in FIG. 1, which is unique in the first embodiment. With only a single oscillating element, the sensor can detect both angular velocity of rotation around a Z-axis shown in FIG. 3 and acceleration in a Y direction. In the description of the first embodiment, since the sensor unit shown in FIG. 3 has already been described the description thereof will be omitted. In addition, regarding the signal processing circuit shown in FIG. 1, the same reference numerals will be given to the same constituents as those in the signal processing circuit shown in FIG. 6, and the explanation of the common parts will be omitted.

The present invention utilizes the fact that an angular-velocity component B3 and an acceleration component C3 of an angular-velocity/acceleration mix signal output are 90° out of phase with each other. The signal processing circuit of the first embodiment separates and extracts the angular-velocity component B3 and the acceleration component C3 of the above angular-velocity/acceleration mix signal.

To accomplish this, the signal processing circuit of the first embodiment, as shown in FIG. 1, is constituted of the first detecting C-V conversion unit 21, the second detecting C-V conversion unit 22, the summing amplifier 23 as a drive-oscillation detecting unit, the differential amplifier 24 as an angular-velocity/acceleration mix signal outputting unit, the AGC unit 25, the phase inverter 26 and the synchronous detector 27, all of which components are the same as in FIG. 6 and are arranged the same way. In addition, the first embodiment includes a synchronous detector 30.

In the first embodiment, the angular-velocity signal extracting unit is formed by the synchronous detector 27, and the acceleration signal extracting unit is formed by the synchronous detector 30.

That is, as described above, the synchronous detector 27 performs synchronous detection of the angular-velocity/acceleration mix signal based on the angular-velocity referring signal which is in phase with the angular-velocity component B3 or 180° out of phase therewith. With this synchronous detection, the synchronous detector 27 eliminates the acceleration component C3 of the angular-velocity/acceleration mix signal, and outputs a signal in accordance with the angular-velocity component B3 as an angular-velocity signal.

The synchronous detector 30 takes in a drive detecting signal output from the summing amplifier 23 as the acceleration referring signal, and further takes in the angular-velocity/acceleration mix signal output from the differential amplifier 24. In addition, the synchronous detector 30 uses the acceleration referring signal to perform synchronous detection of the angular-velocity/acceleration mix signal. Since the drive detecting signal is in phase with the acceleration component C3 of the angular-velocity/acceleration mix signal or 180° out of phase therewith, with the phase of the acceleration referring signal present in a division d1 between 0° and 180° and a division D2 between 180° and 360°, synchronous detection of the angular-velocity/acceleration mix signal is performed. As a result, the angular-velocity component B3 of the angular-velocity/acceleration mix signal is eliminated, and only the acceleration component C3 can be taken out. With this operation, the synchronous detector 30 outputs a signal in accordance with the acceleration component C3 as an acceleration signal.

In this way, the signal separating unit is formed, in which, with the synchronous detector 27 and the synchronous detector 30, the angular-velocity component and the acceleration component of the angular-velocity/acceleration mix signal are separately taken out to output an angular-velocity signal and an acceleration signal.

In the first embodiment, since the signal separating unit is disposed to separately extract the angular-velocity component B3 and the acceleration component C3 from the angular-velocity/acceleration mix signal to output as an angular-velocity signal and an acceleration signal, with only the single oscillating element 8 for commonly detecting angular velocity and acceleration, an angular-velocity signal in accordance with the magnitude of angular velocity and an acceleration signal in accordance with the magnitude of acceleration can be independently obtained.

With this arrangement, by disposing the signal processing circuit of the first embodiment, with only the single oscillating element, both angular velocity and acceleration can be detected. Thus, such an innovative external-force detecting sensor that has never been introduced can be provided.

In addition, as compared with the case in which a gyroscope I and an acceleration sensor, each having an oscillating element, are combined to detect angular velocity and acceleration so as to form a sensor, in the first embodiment, as described above, disposing only one oscillating element is sufficient. Thus, miniaturization of the external-force detecting sensor can be facilitated. Moreover, it is only necessary to utilize a signal processing circuit having a simple circuit structure as shown in FIG. 1. As a result, the number of components is greatly reduced, whereby reduction in the component cost can be achieved. Therefore, the external-force detecting sensor can be provided at low cost.

A description of a second embodiment of the present invention follows.

Figure 2:
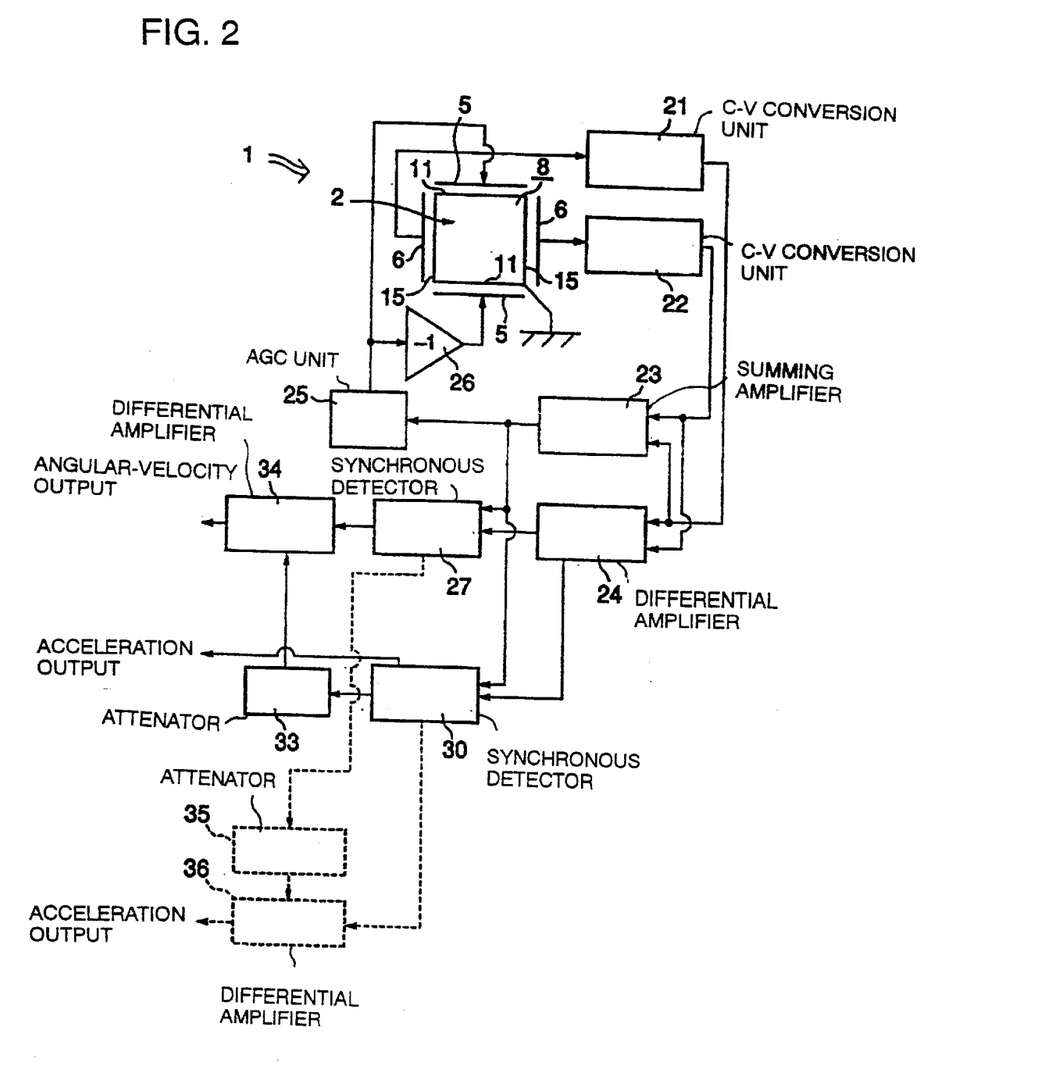
FIG. 2 is a block diagram showing the structure of a signal processing circuit characteristic in a second embodiment of the present invention.

The second embodiment, which is shown in FIG. 2, provides an arrangement in which the precision of detecting angular velocity and acceleration can be further improved. In the second embodiment, the same reference numerals are given to the same constituents as those in the first embodiment, and the explanation of the common parts will be omitted.

As described above, when the synchronous detector 27 and the synchronous detector 30 perform synchronous detection of an angular-velocity/acceleration mix signal, detection-angle deviation may occur. When the detection-angle deviation occurs in the synchronous detector 27, an acceleration noise component caused due to the acceleration component C3 rides on the angular-velocity signal output from the synchronous detector 27. In addition, when the detection-angle deviation occurs in the synchronous detector 30, an angular-velocity noise component caused due to the angular-velocity component B3 rides on the acceleration signal output from the synchronous detector 30. In this way, when the noise components caused due to the detection-angle deviation rides on the angular-velocity signal and the acceleration signal, the precision for detecting the angular velocity and acceleration of the external force detecting sensor is deteriorated.

Whether the detection-angle deviation occurs or not in the synchronous detector 27 and the synchronous detector 30 can be determined in advance by the circuit constant and like of the signal processing circuit. Thus, in the second embodiment, when the detection-angle deviation occurs in the synchronous detector 27, in addition to the arrangement of the first embodiment, an attenuator 33 as an attenuating unit as indicated by the solid line in FIG. 2, and a differential amplifier 34 as a noise eliminating unit are disposed. Furthermore, when the detection-angle deviation occurs in the synchronous detector 30, in addition to the arrangement of the first embodiment, an attenuator 35 as an attenuating unit as indicated by the dotted line in FIG. 2, and a differential amplifier 36 as a noise eliminating unit are disposed.

The ratio of the magnitude of the acceleration noise component caused due to the detection-angle deviation included in the angular-velocity signal with respect to the magnitude of the acceleration signal output from the synchronous detector 30 can be obtained in advance by the circuit constants and the like of the signal processing circuit.

The attenuation rate of the attenuator 33 is pre-set to be at the ratio of the magnitude of the acceleration noise component with respect to the magnitude of the acceleration signal. The attenuator 33 takes in the acceleration signal output from the synchronous detector 30, and attenuates the acceleration signal with the pre-set attenuation rate to output to the differential amplifier 34. That is, the attenuator 33 outputs the signal having the magnitude of the acceleration noise component caused due to the detection-angle deviation included in the angular-velocity signal to the differential amplifier 34.

The differential amplifier 34 takes in the angular-velocity signal output from the synchronous detector 27 as an extracted signal, and obtains the difference between the extracted signal and the signal output from the attenuator 33. Then, the differential amplifier 34 eliminates the acceleration noise component caused due to the detected-angle deviation from the angular-velocity signal to output the signal.

Similarly, The ratio of the magnitude of the angular-velocity noise component caused due to the detected-angle deviation included in the acceleration signal with respect to the magnitude of the angular-velocity signal output from the synchronous detector 27 can be obtained in advance by the circuit constants and the like of the signal processing circuit. The attenuation rate of the attenuator 35 is pre-set to be at the ratio of the magnitude of the angular-velocity noise component with respect to the magnitude. of the acceleration signal output from the synchronous detector 27. The attenuator 35 takes in the angular-velocity signal output from the synchronous detector 27, and attenuates the angular-velocity signal with the pre-set attenuation rate to output to the differential amplifier 36. The signal output from the attenuator 35 is a signal having the magnitude of the angular-velocity noise component caused due to the detected-angle deviation included in the acceleration signal.

The differential amplifier 36 takes in the acceleration signal output from the synchronous detector 30 as an extracted signal, and obtains the difference between the extracted signal and the signal output from the attenuator 35. Then, the differential amplifier 36 eliminates an angular-velocity noise component caused due to the detection-angle deviation from the acceleration signal.

In the second embodiment, when the acceleration noise component caused due to the detection-angle deviation rides on the angular-velocity signal output from the synchronous detector 27, and when the angular-velocity noise component caused due to the detection-angle deviation rides on the acceleration signal output from the synchronous detector 30, the noise components caused due to the detection-angle deviation can be eliminated from the angular-velocity signal and the acceleration signal. As a result, in the angular-velocity signal and the acceleration signal, negative influences due to the detection-angle deviation can be eliminated, whereby deterioration in the precision for detecting the angular velocity and the acceleration can be prevented. Accordingly, in the second embodiment, in addition to the same advantages as those described in the first embodiment, there can be obtained another advantage that reliability in the precision for detecting angular velocity and acceleration can be enhanced.

The present invention is not limited to the above embodiments, and various modifications can be made. For example, in each of the above embodiments, although the sensor unit 2 has the arrangement shown in FIG. 3, it is only necessary for the sensor unit 2 to commonly detect angular velocity and acceleration, and the arrangement of the sensor unit 2 is not restricted to the arrangement shown in FIG. 3. Other appropriate arrangements can be applied thereto.

In addition, in each of the above embodiments, the angular-velocity referring signal and an acceleration referring signal used for synchronous detection are signals based on the drive detecting signal output from the summing amplifier 23. However, for example, the angular-velocity referring signal and the acceleration referring signal may be signals using a driving signal output from the AGC unit 25. In this case, the driving signal is a signal in phase with the angular-velocity component B3 of the angular-velocity/acceleration mix signal or 180° out of phase therewith, and is a signal of 90° out of phase with the acceleration component C3. Thus, the angular-velocity referring signal is formed by the driving signal, and the acceleration referring signal is formed by the signal in which the phase of the driving signal is deviated by 90°.

Moreover, in each of the embodiments, an example of the external-force detecting sensor capable of detecting both angular velocity and acceleration has been introduced. However, for example, the present invention can be applied to gyroscopes detecting only angular velocity, or external-force detecting sensors detecting only acceleration. For example, there can be provided an arrangement in which the attenuator 33 and the differential amplifier 34 shown in the second embodiment are incorporated in the signal processing circuit 20 shown in FIG. 6 in the gyroscope, and, by the attenuator 33 and the differential amplifier 34, an angular-velocity signal in which an acceleration noise component caused due to the detected-angle deviation is eliminated is output. With this arrangement, since the angular-velocity signal in which the acceleration noise component caused due to the detected-angle deviation is eliminated can be obtained, a gyroscope having high precision for detecting angular velocity can be obtained. In addition, in a similar manner, the signal processing circuit of FIG. 6 may be modified so that an acceleration sensor having high precision for detecting acceleration can be obtained.

According to the present invention, there is provided a signal separating unit, by which an angular-velocity component and an acceleration component are separately taken out from the angular-velocity/acceleration mix signal formed by the mixture of an angular-velocity component and an acceleration component to output as an angular-velocity signal and an acceleration signal. In this arrangement, with only one sensor unit disposed for commonly detecting angular velocity and acceleration, an angular-velocity signal in accordance with the magnitude of the angular velocity and an acceleration signal in accordance with the magnitude of the acceleration can be obtained in a separated state. With this arrangement, there can be provided an external-force detecting sensor capable of detecting both angular velocity and acceleration with only one sensor unit disposed.

In addition, in the external-force detecting sensor according to the present invention, it is not necessary to independently dispose a sensor unit for detecting angular velocity and a sensor unit for detecting acceleration. Since it is only necessary to dispose the single sensor as described above, miniaturization of the external-force detecting sensor can be easily achieved. Moreover, since the number of components can be reduced, cost for components can be reduced, with the result that a low-priced external-force detecting sensor can be provided.

In the arrangement in which, by the synchronous detection, an angular-velocity component and an acceleration component are separately extracted from the angular-velocity/acceleration mix signal, with the simple circuit structure, the angular-velocity component and the acceleration component can be easily separated.

When the sensor unit is formed by an oscillating element, angular velocity and acceleration can be detected with high sensitivity. In addition, since the oscillating element has a wide face, as in conventional art, when an oscillating element for detecting angular velocity and an oscillating element for detecting acceleration are both disposed to form a sensor capable of detecting both the angular velocity and acceleration, the size of the sensor is greatly increased. However, in this invention, it is only necessary to dispose a single oscillating element for commonly detecting angular velocity and acceleration, whereby miniaturization of the external force detecting sensor can be achieved, which is effective.

When an angular-velocity referring signal and an acceleration referring signal used for synchronous detection are signals based on a drive detecting signal according to the oscillation in a direction in which the oscillating element oscillates, it is possible to easily suppress the occurrence of the detection-angle deviation in which the phases of the angular-velocity component and the acceleration component in the angular-velocity/acceleration mix signal deviate from the phases of the angular-velocity referring signal and the acceleration referring signal.

In the arrangement in which the attenuating unit and the noise eliminating unit are disposed, whereby, with respect to a signal extracted from one of the angularvelocity signal and the acceleration signal, the signal component of the remaining one thereof as a noise component is eliminated, the precision for detecting angular velocity and acceleration can be more improved.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An external-force detecting sensor comprising:
   a sensor unit for commonly detecting angular velocity and acceleration;
   an angular-velocity/acceleration mix signal outputting unit for outputting an angular-velocity/acceleration mix signal comprised of an angular-velocity component in accordance with the magnitude of angular velocity and an acceleration component in accordance with the magnitude of acceleration that are detected by the sensor unit; and
   a signal separating unit for separating and extracting the angular-velocity component and the acceleration component from the angular velocity/acceleration mix signal to output as an angular-velocity signal and an acceleration signal, the signal separating unit comprising first and second synchronous detectors for providing respectively, the angular-velocity signal and the acceleration signal.

2. An external-force detecting sensor comprising:
   a sensor unit for commonly detecting angular velocity and acceleration;
   an angular-velocity/acceleration mix signal outputting unit for outputting an angular-velocity/acceleration mix signal comprised of an angular-velocity component in accordance with the magnitude of angular velocity and an acceleration component in accordance with the magnitude of acceleration that are detected by the sensor unit; and
   a signal separating unit for separating and extracting the angular-velocity component and the acceleration component from the angular velocity/acceleration mix signal to output as an angular-velocity signal and an acceleration signal, wherein the angular-velocity component and the acceleration component included in the angular-velocity/acceleration mix signal are AC components in which the angular-velocity component is 90° out of phases with the acceleration component; the signal separating unit has an angular-velocity signal extracting unit and an acceleration signal extracting unit; the angular-velocity signal extracting unit uses an angular-velocity referring signal in phase with the angular-velocity component or 180° out of phase therewith to synchronously detect the angular velocity/acceleration mix signal and eliminate the acceleration component so as to output an angular-velocity signal in accordance with the angular-velocity component, and the acceleration signal extracting unit uses an acceleration referring signal in phase with the acceleration component or 180° out of phase therewith to synchronously detect the angular-velocity/acceleration mix signal and eliminate the angular-velocity component so as to output an acceleration signal in accordance with the acceleration component.

3. An external-force detecting sensor according to one of claims 1 and 2, further including an attenuator for receiving at least one of either the extracted angular-velocity signal or the extracted acceleration and for detecting and attenuating a noise component of the extracted signal, and a noise eliminating unit eliminating the noise component included in the extracted signal.

4. An external-force detecting sensor according to claim 2, wherein the sensor unit has an oscillating element capable of freely oscillating both in a direction in which angular velocity and acceleration are commonly detected and in a driving direction orthogonal to the detecting direction, and has a drive-oscillation detecting unit for outputting a driving-detecting signal in accordance with the oscillation of the oscillating element in the driving direction; the angular-velocity/acceleration signal outputting unit outputs an angular-velocity/acceleration mix signal comprised of an angular-velocity component based on the oscillation of the oscillating element in the detecting direction due to angular velocity and an acceleration component based on the oscillation of the oscillating element in the detecting direction due to acceleration; the angular-velocity referring signal is a signal of 90° out of phase with the drive-detecting signal and the acceleration referring signal is a signal in phase with the drive-detecting signal or 180° out of phase therewith.

5. An external-force detecting sensor according to claim 4, further including an attenuator for receiving at least one of either an extracted angular-velocity signal or the acceleration signal and for detecting and attenuating a noise component of the extracted signal, and a noise eliminating unit eliminating the noise component included in the extracted signal.

6. An external-force detecting sensor comprising:
   a sensor unit for commonly detecting angular velocity and acceleration;
   an angular-velocity/acceleration mix signal outputting unit for outputting an angular-velocity/acceleration mix signal comprised of an angular-velocity component in accordance with the magnitude of angular velocity and an acceleration component in accordance with the magnitude of acceleration that are detected by the sensor unit; and
   a signal separating unit for separating and extracting the angular-velocity component and the acceleration component from the angular velocity/acceleration mix signal to output as an angular-velocity signal and an acceleration signal, wherein the sensor unit has an oscillating element capable of freely oscillating in a direction in which angular velocity and acceleration are commonly detected, and the angular-velocity/acceleration signal outputting unit outputs an angular-velocity/acceleration mix signal comprised of an angular-velocity component based on the oscillation of the oscillating element in the detecting direction due to angular velocity and an acceleration component based on the oscillation of the oscillating element in the detecting direction due to acceleration.

7. An external-force detecting sensor according to claim 6, further including an attenuator for receiving at least one of either an extracted angular-velocity signal or the acceleration signal and for detecting and attenuating a noise component of the extracted signal, and a noise eliminating unit eliminating the noise component included in the extracted signal.

8. An external-force detecting sensor comprising:
   a sensor unit for commonly detecting angular velocity and acceleration;
   an angular-velocity/acceleration mix signal outputting unit for outputting an angular-velocity/acceleration mix signal comprised of an angular-velocity component in accordance with the magnitude of angular velocity and an acceleration component in accordance with the magnitude of acceleration that are detected by the sensor unit;

a signal separating unit for separating and extracting the angular-velocity component from the angular velocity/acceleration mix signal to output as an angular-velocity signal and for separating and extracting the acceleration component from the angular velocity/acceleration mix signal to output as an acceleration signal;

an attenuating unit for receiving the acceleration signal and for detecting and attenuating a noise component of the acceleration signal; and a noise eliminating unit receiving an output from the attenuator for eliminating the noise component included in the angular-velocity signal by obtaining a difference between the angular-velocity signal and the output from the attenuator.

9. An external-force detecting sensor comprising:

a sensor unit for commonly detecting angular velocity and acceleration;

an angular-velocity/acceleration mix signal outputting unit for outputting an angular-velocity/acceleration mix signal comprised of an angular-velocity component in accordance with the magnitude of angular velocity and an accleration component in accordance with the magnitude of acceleration that are detected by the sensor unit;

a signal separating unit for separating and extracting the angular-velocity component from the angular velocity/acceleration mix signal to output as an angular velocity signal and for separating and extracting the acceleration component from the angular velocity/acceleration mix signal to output as an acceleration signal;

an attenuating unit for receiving the angular-velocity signal and for detecting and attenuating a noise component of the angular-velocity signal; and a noise eliminating unit receiving an output from the attenuator for eliminating the noise component included in the acceleration signal by obtaining a difference between the acceleration signal and the output from the attenuator.

* * * * *